(12) United States Patent
Banal et al.

(10) Patent No.: US 7,008,208 B1
(45) Date of Patent: Mar. 7, 2006

(54) GROUNDED MOLDING TOOL FOR MANUFACTURE OF OPTICAL COMPONENTS

(75) Inventors: Anthony O. Banal, Fergus Falls, MN (US); Gordon L. Hall, Fergus Falls, MN (US); Loryn D. Klumper, Wahpeton, ND (US); Kraig A. Kohout, Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 526 days.

(21) Appl. No.: 10/053,173

(22) Filed: Jan. 17, 2002

(51) Int. Cl.
*B29D 11/00* (2006.01)

(52) U.S. Cl. ............... 425/139; 425/542; 425/444; 425/808

(58) Field of Classification Search ............... 425/139, 425/192 R, 444, 542, 810; 264/106, 107
See application file for complete search history.

(56) References Cited

U.S. PATENT DOCUMENTS

| | | | |
|---|---|---|---|
| 3,565,978 A | | 2/1971 | Folger et al. |
| 3,768,227 A | * | 10/1973 | Grisell ............... 53/449 |
| 4,374,077 A | | 2/1983 | Kerfeld |
| 4,374,636 A | * | 2/1983 | Holmes ............ 425/589 |
| 4,726,006 A | | 2/1988 | Benne et al. |
| 4,729,938 A | | 3/1988 | Tajima et al. |
| 5,149,607 A | | 9/1992 | De Graaf et al. |
| 5,458,985 A | | 10/1995 | Isono et al. |
| 5,586,109 A | | 12/1996 | Inui et al. |
| 5,597,613 A | | 1/1997 | Galarneau et al. |
| 6,054,075 A | * | 4/2000 | Inaba et al. ............ 264/40.1 |
| 6,190,838 B1 | | 2/2001 | Kerfeld |
| 6,238,197 B1 | * | 5/2001 | Van Hout et al. ........... 425/168 |
| 6,354,827 B1 | * | 3/2002 | Kerfeld ............... 425/195 |
| 2002/0185759 A1 | * | 12/2002 | Gorczyca et al. .......... 264/1.33 |

FOREIGN PATENT DOCUMENTS

| | | |
|---|---|---|
| EP | 0 358 276 | 3/1990 |
| FR | 2 676 577 | 11/1992 |
| JP | 57-172553 | 10/1982 |
| JP | 59-114031 | 6/1984 |
| JP | 61-95911 | * 5/1986 |
| JP | 62-095749 | 5/1987 |
| JP | 01-301880 | 12/1989 |
| JP | 3-037842 | 2/1991 |
| JP | 9-097452 | 4/1997 |
| JP | 9-138981 | 5/1997 |
| WO | WO 97/12279 | 4/1997 |
| WO | WO 99/52105 | 10/1999 |

OTHER PUBLICATIONS

English abstract for JP 61-95911.*
Dill, F. et al., "Characterization of Positive Photoresist," *IEEE Transactions on Electron Devices*, ED-22, No. 7, pp. 445-452 (Jul. 1975).

(Continued)

*Primary Examiner*—Donald Heckenberg
(74) *Attorney, Agent, or Firm*—Eric D. Levinson (57) ABSTRACT

In one embodiment, the invention is directed to an injection molding tool that has improved grounding. The injection molding process creates significant amounts of static electricity in the molten thermoplastic. This static electricity can be more adequately dissipated from the system through the addition of one or more paths to ground. In this manner, a significant reduction in charge passing between the stamper and the mirror block can be achieved. By reducing or eliminating the amount of charge passing between the stamper and the mirror block, erosion of the mirror block can be reduced or avoided.

9 Claims, 6 Drawing Sheets

OTHER PUBLICATIONS

Trefonas, P., et al., "New Principle for Image Enhancement in Single Layer Positive Photoresists," Proc. for SPIE, 771, pp. 194-206 (Mar. 1987).

Horigome et al., "Novel stamper process for optical disc," Optical Storage Technology and Applications, Proceedings of SPIE-The International Society for Optical Engineering, Los Angeles, CA, Jan. 12-15, 1998, vol. 899, XP 000010872, pp. 123-128.

Nakamura, Shigeru et al., "High Density Recording for Magneto-optical Disk Drive," *IEEE Transactions on Magnetics*, 34, No. 2, pp. 411-413 (Mar. 1998).

* cited by examiner

GROUNDED MOLDING TOOL FOR MANUFACTURE OF OPTICAL COMPONENTS

TECHNICAL FIELD

The invention relates to injection molding of optical components such as optical data storage disks.

BACKGROUND OF THE INVENTION

Injection molding tools can be used to create high quality optical components such as optical data storage disks. Optical data storage disks have gained widespread acceptance for the storage, distribution and retrieval of large volumes of information. Optical data storage disks include, for example, audio CD (compact disc), CD-R (CD-recordable), CD-ROM (CD-read only memory), DVD (digital versatile disk or digital video disk) media, DVD-RAM (DVD-random access memory), and various types of rewritable media, such as magneto-optical (MO) disks and phase change optical disks. Some newer formats for optical data storage disks are progressing toward smaller disk sizes and increased data storage density. Injection molding tools are also used to create other molded components such as optical components having a high quality reflective surface.

The process of creating high quality injection molded components begins with a mastering process. For example, the creation of optical data storage disks involves making a master disk that has a surface pattern that represents encoded data on the master disk surface. The surface pattern, for instance, may be a collection of grooves that define master pits and master lands. The mastering process is a relatively expensive process in which a photoresist is coated on a master substrate, exposed to electromagnetic radiation to develop a photoresist pattern, and then removed in the non-developed regions. The mastering process may be used not only for pre-recorded disks but also rewritable disks that carry a pattern on the substrate, such as servo tracking or pre-recorded information.

After creating a suitable master, that master can then be used to make a stamper. The stamper has a surface pattern that is the inverse of the surface pattern encoded on the master. For example, to create a stamper suitable for use in an injection molding process, a thin nickel layer can be deposited on the patterned master surface. Then, in an electroplating process, a nickel structural layer can be uniformly plated onto the nickel coated surface of the master. When the electroplating process is complete, the nickel layers can be collectively removed from the master to form a nickel stamper.

The stamper, then, can be inserted within an injection molding tool, and the injection molding tool can be used to injection mold large quantities of molded components such as molded replica disks. The injection molding tool typically includes mirror blocks positioned on both sides of a mold cavity. The stamper can be vacuum drawn against one of the mirror blocks and hot molten thermoplastic can be injected into the mold cavity. The molten thermoplastic conforms to the mold cavity, defining an inverse of the pattern preserved on the stamper. The mirror blocks provide extremely flat surfaces to support the back side of the stamper and to define the non-stamper side of the mold cavity. In addition, the mirror blocks typically include a coolant system to control cooling of the molten thermoplastic.

Upon cooling, the molded component may contain the pattern originally encoded on the master and preserved in the stamper. For example, molded replica disks may contain the data and tracking information that was encoded on the master. Alternatively, the process can be used to create other types of molded components such as high quality reflective components. In that case, the mastering process would define the high quality reflective surface of the molded component that is ultimately created in the injection molding process.

SUMMARY

In general, the invention is directed to an injection molding tool that has improved grounding. The injection molding process creates significant amounts of static electricity in the molten thermoplastic material. This static electricity can be more adequately dissipated from the system through the addition of one or more conductive paths to ground. In this manner, a significant reduction in charge passing between the stamper and the mirror block can be achieved. By reducing or eliminating the amount of charge passing between the stamper and the mirror block, erosion of the mirror block can be reduced or avoided. Reduction or avoidance of mirror block erosion can significantly improve the longevity of the mirror block and maintain the quality of optical components produced by a mold that incorporates the mirror block.

In one embodiment, the invention is directed to an injection molding technique that includes grounding a molding tool so as to reduce charge dissipation through an air interface between a stamper and a mirror block of the molding tool. The method may also include creating a molded component using the molding tool.

In other embodiments, the invention is directed to a molding tool. For example, the molding tool may include a moving side and a non-moving side. In addition, the molding tool may include a substantially non-resistive path to ground coupled to the moving side. For example, the substantially non-resistive path may comprise an electrically conductive ground strap coupled to the moving side. The molding tool may form part of an automated molding system that includes a control unit coupled to the molding tool to control a molding process of the molding tool. A robotic arm may be coupled to the control unit, and controlled to receive molded components from the molding tool.

The invention is capable of providing several advantages. For example, the invention can increase the number of molding cycles that can be performed before a mirror block requires resurfacing. In addition, the invention may also prolong the life of stampers used in molding tools. In both cases, by increasing the number of molding cycles that can be performed before the molding tool requires maintenance, the per-component cost of injection molding can be significantly reduced.

Additional details of these and other embodiments are set forth in the accompanying drawings and the description below. Other features, objects and advantages will become apparent from the description and drawings, and from the claims.

DETAILED DESCRIPTION

Figure 1:
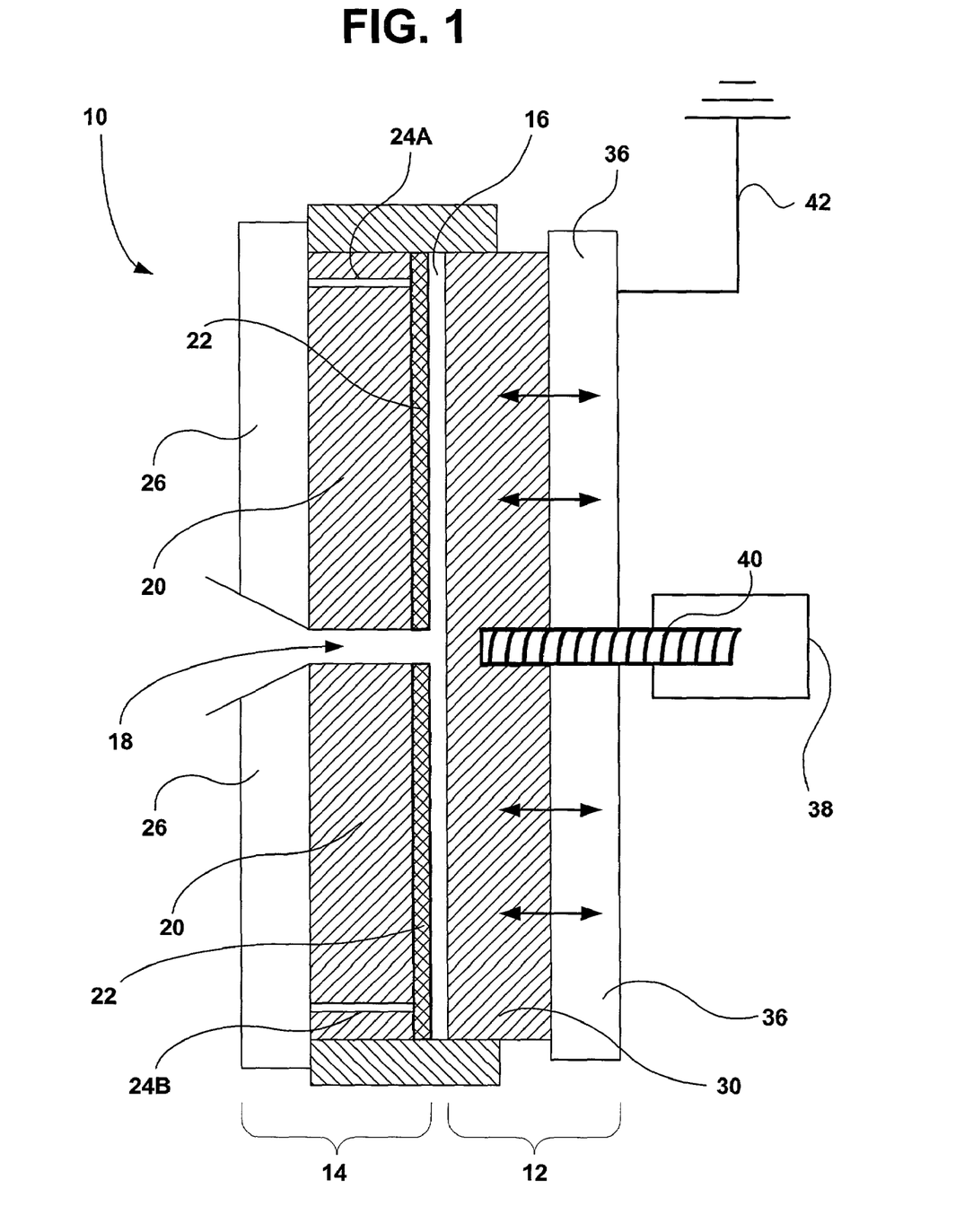
FIG. 1 is a cross-sectional side view of an exemplary molding tool according to an embodiment of the invention.

FIG. 1 is a cross-sectional side view of a molding tool according to an embodiment of the invention. Molding tool 10 is an injection molding tool for injection molding thermoplastic material into high quality optical components. In the description that follows, many aspects of the invention are described in the context of an injection molding process for creating optical data storage disks. However, it is understood that the invention is not limited to the types of components being molded. Rather, the invention is readily applicable to injection molding tools which are customized to make high quality optically molded components including components having a high quality reflective surface or other components which require precision flat surfaces of mirror blocks within the injection mold.

Molding tool 10 includes a moving side 12 and a non-moving side 14 that define a cavity 16. Non-moving side 14 includes a mirror block 20 and a stamper 22 positioned adjacent mirror block 20. Mirror block 20 may include vacuum ports 24A and 24B to hold stamper 22 in place. In other words, a vacuum force can be used to hold stamper 22 next to mirror block 20. Mirror block 20 may be fixed to a support structure 26. In operation, molten thermoplastic material is injected into cavity 16 through injection aperture 18 of non-moving side 14. The molten thermoplastic then cools, and moving side 12 retracts to open cavity 16 so that the molded component can be removed.

Moving side 12 also includes a mirror block 30, but may not include a stamper. In that case, the molded component being created may be an optical data storage disk having information stored on only one side, i.e., the side corresponding to non-moving side 14 of molding tool 10. Mirror block 30 may be fixed to a support structure 36.

Moving side 12 also includes a moving unit 38 such as a computer controlled hydraulic system. The moving unit 38 can be used to open and close mold cavity 16 by moving the moving side 12. Moving unit 38 includes various hydraulic components 40 that connect to support structure 36 and possibly mirror block 30. Moreover, the hydraulic components 40 are typically greased to reduce friction during movement and generally improve the ability to move moving side 12. The greased hydraulic components 40, however, also provide a relatively large amount of electrical resistance between moving unit 38 and the other components of moving side 12.

The molten thermoplastic material is typically injected through injection aperture 18 at extremely high pressures. For example, in creating molded optical storage disks, molten thermoplastic material may be injected through injection aperture 18 at pressures on the order of 25,000 to 30,000 pounds per square inch (PSI). In that case, mold cavity 16 can be filled in approximately 0.2 to 0.3 seconds. A cooling system within mirror blocks 20 and 30 can control the cooling of the thermoplastic material, and once cooled, the mold cavity 16 may open by movement of moving side 12. The cooling system within mirror blocks, for example, may comprise water filled coils that can be used to control cooling of the molten thermoplastic material.

The high pressure at which the thermoplastic material is injected into molding tool 10 causes shearing in the thermoplastic material. In other words, frictional strain in the material caused by the high pressure injection can cause significant static electricity to be created in the injected material. Thus, once mold cavity 16 is filled with thermoplastic material, the material may possess a significant static charge. For example, static charge on the order of 100,000 volts may be created inside mold cavity 16, assuming the pressures mentioned above. This static charge dissipates through molding tool 10, following the least resistive path to ground.

In accordance with the invention, moving side 12 of molding tool 10 is coupled to a substantially non-resistive path to ground (as indicated at numeral 42). For example, a ground strap can be attached from support structure 36 of moving side 12 to any adequately grounded structure. In this manner, static charge may dissipate from mold cavity 16 through mirror block 30 and support structure 36 and ultimately to ground via the substantially non-resistive path indicated by numeral 42.

The ground strap may be any substantially conductive wire electrically coupling the moving side 12 to any grounded reference voltage. In one specific example, the ground strap is a braided copper wire having a length on the order of a meter. Other conductive wires of various lengths could also be used. The ground strap may be firmly connected to the moving side via any suitable attachment mechanism such as a screw, a clamp, welding, or the like, to provide the substantially non-resistive path to ground 42. In one case, the grounded reference voltage may comprise the non-moving side of the molding tool.

The substantially non-resistive path to ground 42 provides significant improvement to the life cycle of molding tool 10. Without the substantially non-resistive path 42, first side may not be suitably grounded because the hydraulic components 40 include a grease barrier. Thus, without non-resistive path 42, the static charge substantially dissipates through non-moving side 14, which can cause significant erosion to mirror block 20. Erosion to mirror block 20 is a significant concern because of the cost and time it takes to resurface mirror blocks. Moreover, even a small amount of erosion can undermine the creation of optical data storage disks or other high quality optical components because of the precision flat surface required for mirror blocks.

As mentioned, stamper 22 is vacuum drawn to mirror block 20 via vacuum ports 24A and 24B. Thus, there remains a small air gap between stamper 22 and mirror block 20. When charge passes across this small air gap, a small spark is created which can cause erosion in mirror block 20. The invention can reduce or eliminate this erosion by providing the static charge within cavity 16 an alternative path to ground via the ground strap.

EXAMPLE

Sumitomo CD-RW Molding System, model number SD 40, commercially available from Sumitomo Plastics-Machinery of Norcross, Ga. was used to mold optical data storage disks. A molding tool within the Sumitomo CD-RW Molding System operated in a manner similar to the description above with reference to FIG. 1. However the molding tool originally did not include the substantially non-resistive path to ground 42.

In that case, the life cycle of the mirror block adjacent the vacuum drawn stamper was only approximately 75,000 molding cycles. After 75,000 cycles, the mirror block required resurfacing because of erosion. Resurfacing of a mirror block may take approximately four to six weeks and typically costs approximately $4000. Given the number of molding cycles, erosion in the mirror block was adding more than $0.05 of cost to each molded data storage disk.

The erosion pattern of the eroded mirror block was examined under a microscope. The microscopic inspection revealed that the erosion in the mirror block looked similar to metallic surfaces finished using Electric Discharge Matching (EDM) processes. For this reason, it was hypothesized that the static charge within the mold cavity was dissipating between the stamper and the mirror block causing sparks that would systematically erode the mirror block in a manner similar to EDM processes.

A ground strap was installed on the molding tool of the Sumitomo CD-RW molding system to connect the non-moving side of the molding tool to a grounded structure. The molding process was then re-initiated. In that case, when the molding tool conformed to the illustration in FIG. 1, erosion in the mirror block adjacent the vacuum drawn stamper was significantly reduced. Specifically, more than 900,000 molding cycles were performed before the mirror block required resurfacing. Thus, with a ground strap installed in the molding tool, erosion in the mirror blocks accounted for less than $0.005 of the cost of each molded data storage disk, which was more than a 10-fold reduction in costs relating to resurfacing of the mirror blocks.

Different mirror blocks were tested with the ground strap installed. Mirror blocks having titanium nitride coatings and diamond like carbon coatings both proved very useful. For example, titanium nitride (TiN) coated mirror blocks lasted more than 500,000 molding cycles after installing a ground strap, and diamond like carbon (DLC) coated mirror blocks lasted more than 900,000 cycles with the ground strap installed. In the case of titanium nitride (TiN) coated mirror blocks, a number of molding cycles had already been performed prior to installing the ground strap. Thus, it is likely that significantly more than 500,000 molding cycles can be achieved with the ground strap installed on a molding tool using a titanium nitride (TiN) coated mirror block on the non-moving side.

Additional benefits of grounding the moving side of a molding tool include the extended life of the stamper. In other words, in addition to significantly extending the life of the mirror block on the non-moving side of the molding tool, stamper life may also be extended when a ground strap is installed as described above. Without a ground strap installed, the useful life of a nickel stamper was approximately 25,000 molding cycles. With the ground strap installed, the useful life of a nickel stamper was greater than 50,000 molding cycles.

Figure 2:
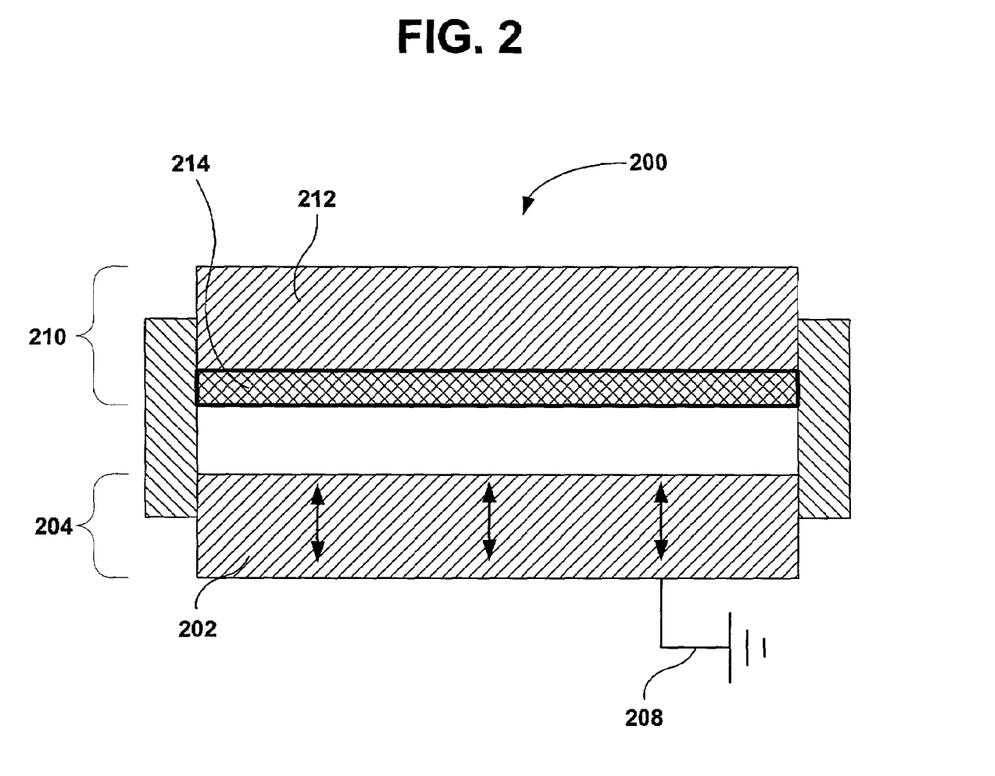
FIG. 2 is a cross-sectional side view of a molding tool that has a mirror block on a moving side that is grounded in accordance with an embodiment of the invention.

FIGS. 2–5 are cross-sectional side views of exemplary molding tools configured to reduce charge dissipation through an air interface between a stamper and a mirror block. For simplicity, various features such as injection apertures and moving units are not illustrated. In particular, FIG. 2 illustrates molding tool 200 in which mirror block 202 of moving side 204 is connected to ground as indicated at numeral 208. Molding tool 200 may also include a non-moving side 210 that includes a mirror block 212 and a stamper 214 adjacent mirror block 212.

Figure 3:
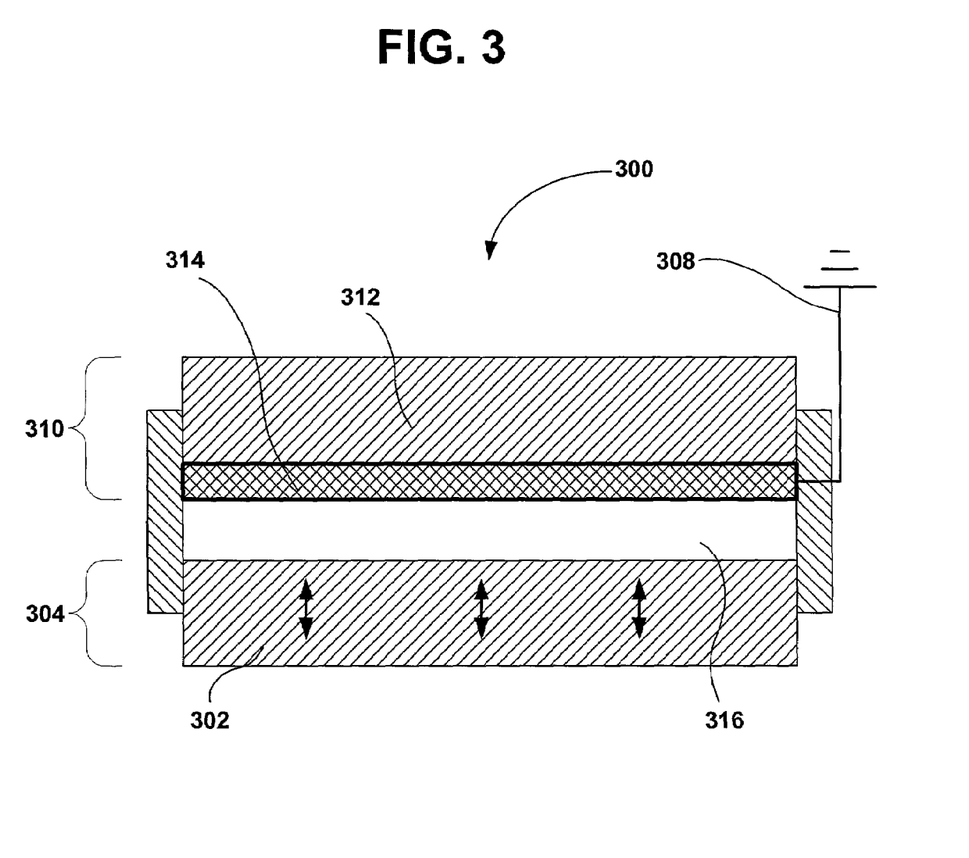
FIG. 3 is a cross-sectional side view of a molding tool that has a stamper that is grounded in accordance with an embodiment of the invention.

In FIG. 3, stamper 314 on the non-moving side 310 of molding tool 300 is connected to ground as indicated by numeral 308. In that case, by connecting stamper 314 directly to ground, static charge within cavity 316 will not substantially dissipate across the air gap between stamper 314 and mirror block 312.

Figure 4:
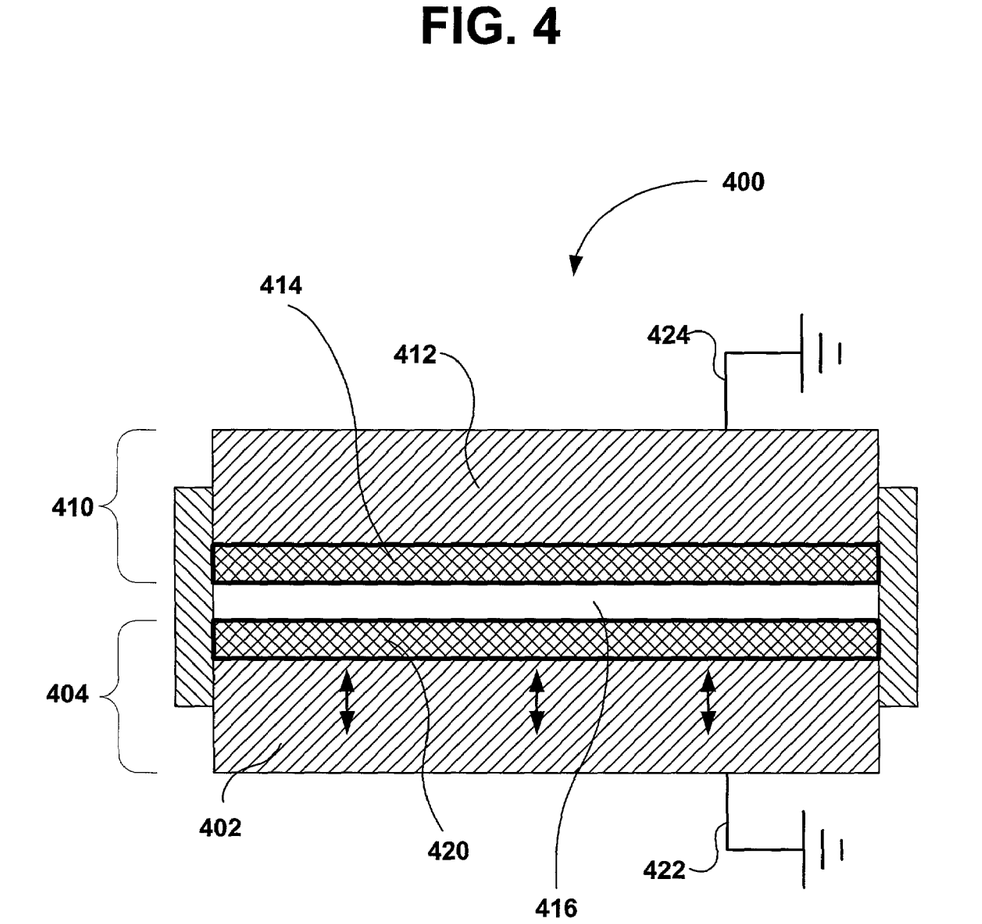
FIG. 4 is a cross-sectional side view of a molding tool that has two mirror blocks that are grounded in accordance with an embodiment of the invention.
Figure 5:
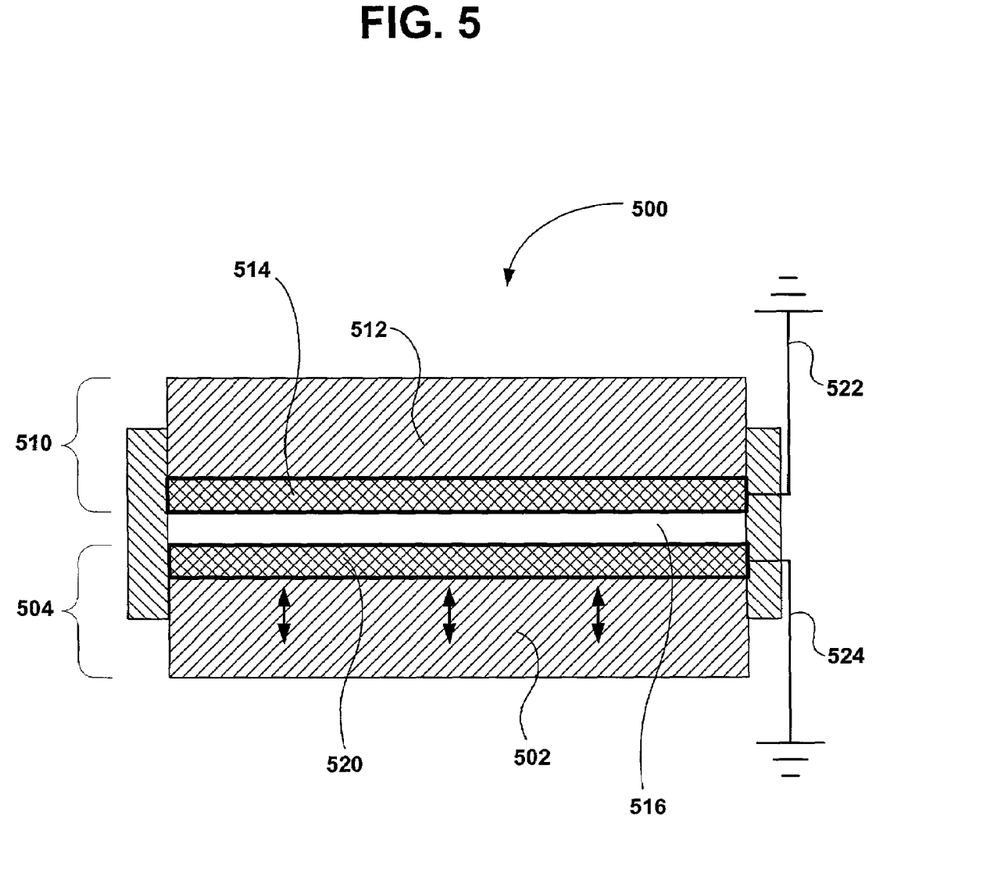
FIG. 5 is a cross-sectional side view of a molding tool that has two stampers that are grounded in accordance with an embodiment of the invention.

FIGS. 4 and 5 illustrate how the principles of the invention may be extended to two sided molding tools, i.e., molding tools configured with stampers on both sides of a mold cavity. Two sided molding tools are desirable for creating many types of optical components including data storage disks having information encoded on both sides.

In FIG. 4 molding tool 400 includes a moving side 404 and a non-moving side 410. Both moving side 404 and non-moving side 410 include mirror blocks and stampers. For example, moving side 404 includes a first mirror block 402 and a first stamper 420 and non-moving side 410 includes a second mirror block 412 and a second stamper 414. Both mirror blocks 402 and 412 can be coupled to ground as indicated at 422 and 424. Although the configuration of FIG. 4 may not eliminate charge dissipation across air gaps between the stampers 420, 414 and mirror blocks 402, 412, the configuration may be used to ensure that static charge within mold cavity 416 dissipates substantially equivalently across the two air gaps between the stampers and 420, 414 and mirror blocks 402, 412.

FIG. 5 illustrates a two sided molding tool 500 similar to that illustrated in FIG. 4. However, in FIG. 5, both stampers 520 and 514 are directly coupled to ground as indicated by numerals 522 and 524. This configuration ensures that static charge within mold cavity 516 will not substantially dissipate across the air gaps between the stampers and 520, 514 and mirror blocks 502, 512.

Figure 6:
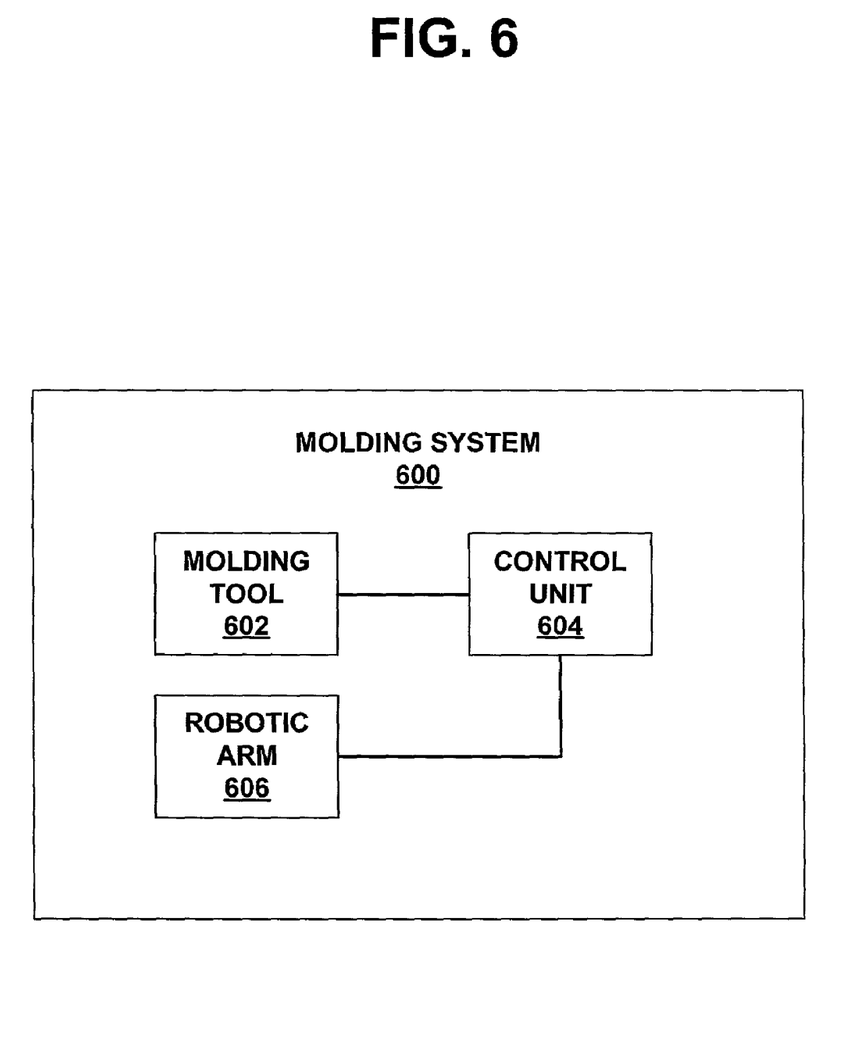
FIG. 6 is a block diagram of a molding system incorporating one or more aspects of the invention.

FIG. 6 is a high level block diagram of a molding system. In accordance with the invention, molding system 600 includes a molding tool 602 configured to reduce charge dissipation through an air interface between a stamper and a mirror block as described herein. Molding tool 602 may be coupled to a control unit 604 that automates and controls the injection molding process. Molding system 600 may also include a robotic arm 606 coupled to the control unit 604.

In an automated injection molding process, control unit 604 controls the injection molding process within molding tool 602. Once the molten thermoplastic has been molded within molding tool 602 and cooled by a sufficient amount, control unit 604 directs molding tool 602 to open and drop the molded component onto robotic arm 606. Robotic arm 606 may include pressure sensors to sense the molded component. Once robotic arm 606 has received and sensed the molded component, robotic arm 606 can move the molded component to a location for further cooling and processing, such as a conveyor belt (not shown) of molding system 600. Control unit 604 can then direct the molding tool 602 to perform another molding cycle. Because molding tool 602 is configured to reduce charge dissipation through an air interface between a stamper and a mirror block, the number of molding cycles that molding system 600 can perform before molding tool 602 requires maintenance can be significantly increased.

Various embodiments of the invention have been described. For instance, a technique of grounding a molding tool so as to reduce charge dissipation through an air interface between a stamper and a mirror block of the molding tool has been described. A number of exemplary structures for achieving adequate grounding have also been described. Nevertheless, various modifications may be made without departing from the scope of the invention. For example, other structures or configurations could be designed to adequately ground a molding tool so as to reduce charge dissipation through an air interface between a stamper and a mirror block of the molding tool. In addition, although various aspects of the invention have been described in terms of molding optical data storage disks, it is understood that the principles of the invention are not necessarily limited to types of molded components being created. Accordingly, other embodiments are within the scope of the following claims.

What is claimed is:

1. A molding tool comprising:
   a moving side comprising a first mirror block;
   a non-moving side comprising a second mirror block, a stamper and an air interface between the second mirror block and the stamper; and
   a ground strap attached to the first mirror block of the moving side, the ground strap providing a substantially non-resistive electrical path from the first mirror block to a grounded voltage.

2. The molding tool of claim 1, wherein the stamper is a nickel stamper and the first and second mirror blocks include diamond-like carbon coatings.

3. The molding tool of claim 1, wherein the stamper is a nickel stamper and the first and second mirror blocks include titanium nitride coatings.

4. The molding tool of claim 1, wherein the stamper is vacuum drawn to the second mirror block.

5. The molding tool of claim 1, wherein the molding tool is an injection molding tool.

6. A molding system comprising:
   a molding tool including a moving side comprising a first mirror block; a non-moving side comprising a second mirror block, a stamper and an air interface between the second mirror block and the stamper; and a ground strap attached to the first mirror block of the moving side, the ground strap providing a substantially non-resistive electrical path from the first mirror block to a grounded voltage;
   a control unit coupled to the molding tool to control a molding process of the molding tool; and
   a robotic arm coupled to the control unit for receiving molded components from the molding tool.

7. A molding tool comprising:
   a moving side comprising a first mirror block, a first stamper and a first air interface between the first mirror block and the first stamper;
   a non-moving side comprising a second mirror block, a second stamper and a second air interface between the second mirror block and the second stamper;
   a first ground strap attached to the first stamper of the moving side, the first ground strap providing a substantially non-resistive electrical path from the first stamper to a grounded voltage; and
   a second ground strap attached to the second stamper of the non-moving side, the second ground strap providing a substantially non-resistive electrical path from the second stamper to the grounded voltage.

8. A molding tool comprising:
   a moving side comprising a first minor block, a first stamper and a first air interface between the first mirror block and the first stamper;
   a non-moving side comprising a second mirror block, a second stamper and a second air interface between the second minor block and the second stamper;
   a first ground strap to provide a first substantially non-resistive electrical path from the first mirror block to a grounded voltage; and
   a second ground strap to provide a second substantially non-resistive electrical path from the second mirror block to the grounded voltage.

9. A molding tool comprising:
   a moving side comprising a first mirror block;
   a non-moving side comprising a second mirror block, a stamper and an air interface between the second mirror block and the stamper; and
   a ground strap coupled to the stamper of the non-moving side to provide a substantially non-resistive electrical path from the stamper to a grounded voltage.

* * * * *